3,514,374
METHOD OF PURIFICATION OF MYXOVIRUS VACCINE

William J. McAleer, Ambler, and Edward H. Wasmuth, Telford, Pa., assignors to Merck & Co., Inc., Rahway, N.J., a corporation of New Jersey
No Drawing. Filed Apr. 2, 1968, Ser. No. 718,190
Int. Cl. C12k 1/00, 5/00, 7/00
U.S. Cl. 195—1.5     3 Claims

ABSTRACT OF THE DISCLOSURE

Prior to ultracentrifuge sedimentation of myxovirus virus the growth medium containing it is successively passed through 1, a filter having large pores, 2, a filter having 0.8 to 2.0 micron pores and 3, a filter having 0.22 to 0.6 micron pores.

---

This invention relates to the production of influenza and other myxovirus vaccines and particularly to a process for recovering the virus from a growth medium in substantially pure form and in a high yield.

Myxovirus are influenza, para-influenza, measles and mumps. They are distressing causes of both severe and mildly acute illnesses in man. To reduce the incidence of these illnesses, vaccines made from the killed viruses are available but they have the disadvantage of being expensive to make in highly purified form. The virus to be used in making the vaccine is grown in living cells such as in the allantoic fluid cells of eggs or in culture media containing animal tissue cells and thereafter the virus must be recovered in the purest possible form, free of the culture cells and constituents thereof. Previous vaccines have heretofore been available only in highly impure state and the impurities (such as egg protein) can cause severe reaction in persons sensitive to these materials.

Prior processes for the recovery of a relatively purified virus have been essentially batch operations involving cumbersome and complex manual manipulations. Moreover, prior processes did not specifically remove microbial contaminants. A known process utilizes adsorption-desorption techniques and although it produces a fairly pure virus in a relatively high yield, it is time-consuming and therefore results in an expensive product. A reduction in the cost of the purified virus is desirable as it increases the number of persons who can afford the purchase of the vaccine which is so important to their health.

The present invention provides a process which includes substantially continuous operational steps and these operations can readily be carried on in large scale factory flow systems. Not only is a highly purified virus obtained but it is produced in a high yield in a relatively short time and consequently an inexpensive vaccine can be made.

The process of this invention employs the conventional use of an ultracentrifuge, e.g. one operating above 50,000 g, but the feature of the invention is the use of filtration steps just prior to this ultracentrifugation to remove contaminants which are larger than the virus and principally microbial contaminants. These pretreatments before ultracentrifugal sedimentation make possible the direct preparation of highly purified, sterile vaccines directly from the centrifuged products without subsequent treatments. The initially sedimented vaccines of the prior art are substantially less pure and nonsterile.

Prior to the present invention it was thought that it would be impossible to employ preliminary filtration of the culture medium containing the virus, prior to centrifugation for the reason that the filter pads would promptly clog up and prevent the passage of the virus. It was thought that if large pore filtration pads were used to overcome loss of virus on the pads, too much of the coarse contaminants would pass through the filter.

The invention involves the known use of an ultracentrifuge to sediment the virus from a liquid containing it and the feature of the invention is the use of specific filtration conditions which are carried on just prior to the ultracentrifugation step. The invention involves the discovery that the successive use of filters of specified pore size, their large surface area, and an established flow-rate through them, will produce a liquid containing nearly all the virus which is essentially free of contaminatory substances from the growth medium. This end filtrate can be delivered directly to the ultracentrifuge to obtain the virus in concentrated form. This concentrated virus is to be used in making a vaccine by resuspending it in a conventional manner in an injectable liquid such as physiological phosphate buffer.

The specific details of the filtration step of this invention will be defined but it should first be mentioned that prior to the filtration operation, it is best but not essential that a conventional clarification step be performed. This preliminary clarification should remove relatively large particles of the culture media, such as cellular clumps from the allantoic fluid in which the virus was grown. For this purpose a moderate speed, disc-type centrifuge (such as DeLaval Model PX) operating in the general field of 15,000 $g$ is suitable. It is to be understood that other preliminary gross clarification methods may be used, such as ordinary settling and decanting, and that in fact this preliminary clarification may be eliminated altogether. Its elimination, however, will require more frequent change of the subsequent initial filtration pad.

The filtration steps of this invention are specifically established to successively remove smaller and smaller microbial and other contaminating particles so that the filtrate is a sterile liquid containing only the virus particles. This filtration involves the following sequence steps:

(a) Relatively large pore prefilter such as cellulosic pads, diatomaceous earths, or spun glass. (Millipres Spef. Apr.)
(b) 1.2 micron pad preferably, but can be in the 0.8–2.0 micron range.
(c) 0.45 micron pad preferable, but can be in the 0.22–0.6 range.

It is important that for each filtration step the pad area be about 100 square centimeters for each 1 to 1.5 liters of the fluid and that for every 100 square centimeters the flow rate be in the range of 1 to 1.5 liters per 10 minutes. To speed up this filtration operation, if it proves to be necessary to obtain this flow rate, air pressure may be applied to one or all three filtration steps. With increased fluid volume above this range some plugging of the filter can occur and this will result in failure of some virus to pass through. It is important that the filtration area be relatively large as specified above as otherwise the operation will be slow, complete filtration at each step will not be achieved and loss of virus on the pads will occur.

The final filtrate from these steps will be found to be clear and sterile and to contain nearly all of the original virus growth. To sediment the virus particles in this filtrate the high speed centrifuge is utilize and this may be in the 50,000 to 80,000 $g$ field. A representative apparatus is the Sharples Model T–1P Presurtite. This will concentrate the virus to a thick slurry and this operation should be carried out as a continuous operation. For commercial production it would be preferable to use a zonal type ultracentrifuge such as the Spinco Md L–4 Zonal Centrifuge or the Oak Ridge K11 Zonal Centrifuge.

This final concentrated virus from the centrifuge may be used at once to make a vaccine by adding it to an injectable liquid to a suitable dilution, or the slurry may be put up in sterile form, after lyophilization, if desired, for subsequent resuspension.

The virus may be killed at any step in the operation. This may be before the initial clarification if it is used, during one of the filtration steps or after ultracentrifugation. Known inactivation agents such as Formalin may be used, the amount and concentration being in accordance with established standards.

Although the invention will be described in the examples with particular reference to influenza virus which has been grown in allantoic fluid and has subsequently been killed, the invention may be practiced with other viruses, grown in other culture medium such as ones containing tissue cells, and the virus may or may not be killed.

Representative examples are the following:

EXAMPLE 1

450 fertilized hens' eggs were infected with $A_2$ strain of influenza (JAP 170) and held at 37° C. for 40 hours. The allantoic fluid containing the grown virus was removed from the eggs by suction and collected into a pool measuring about 4500 ml. The fluid was then treated with paraformaldehyde at the $\frac{1}{400}$ by volume level at 35° C. for 24 hours, to inactivate the virus.

The entire pool was run at 300 ml./min. through De Laval Gyro Tester or similar centrifuge operating at 12,000 r.p.m. (about 15,000 *g*) and the clarified fluid was collected.

Then centrifuge-clarified fluid was first passed through a 500 cm.$^2$ spun glass prefilter such as a No. 142 Millipore filter, next through a 500 cm.$^2$–1.2 micron filter pad and finally through a 500 cm.$^2$–0.45 micron filter pad. Air pressure of about 20 p.s.i. was applied at each step and the total time of filtration was 8 minutes. Recovery of the vaccine at this state is 86% based on standard CCA assays.

Final concentration of the vaccine was accomplished by sedimentation in a high speed centrifuge operating at 50,000 r.p.m. with a fluid flow at about 1.0 liter per hour. The sedimented virus is used to make the vaccine.

EXAMPLE 2

3500 fertilized hens' eggs were infected with a B strain of influenza (B/mass) and held at 37° C. for 40 hours. The allantoic fluid was removed from the eggs by suction and collected into a pool measuring about 35,000 mls. The fluid was treated with formaldehyde at the $\frac{1}{4000}$ by volume level at 35° C. for 24 hours.

The entire pool was run at 300 mls./min. through a centrifuge such as a De Laval Gyro Tester operating at 12,000 r.p.m. Air pressure was used to force the liquid through the centrifuge and the rate was measured with a flowmeter to approximately maintain the rate. The clarified fluid was collected in a pressure vessel.

This centrifuge-clarified fluid was first forced through a 3100 cm.$^2$ prefilter pad (Multiplate Filter Holder) followed by a 3100 cm.$^2$ 1.2$\mu$ filter pad and finally through a 2300 cm.$^2$ 0.45$\mu$ filter pad. The filtration air pressure used was 20 p.s.i. and the total time of filtration was 15 minutes. Recovery of the vaccine at this stage is 84% based on a standard CCA assay.

Final concentration of the vaccine was accomplished in a Sharples Hi-Speed Centrifuge operating at 50,000 r.p.m. with a fluid flow of 1.5 l./hr. The sedimented virus is used to make the vaccine.

EXAMPLE 3

The process of either of the above examples is carried out with the change that the hens' eggs are infected with one of the viruses, para-influenza, measles or mumps.

In the above examples the initial centrifugal clarification can be omitted and the initial filter pad be replaced more often.

What is claimed is:

1. A method of obtaining sterile, sedimented myxovirus from egg allantoic fluid growth medium which comprises:
- (A) centrifugation at about 15,000 *g*;
- (B) passing up to 1.5 liters of the growth medium per 100 cm.$^2$ of filter area at a rate of 100 to 150 ml./minute/100 cm.$^2$ of filter area successively through filter pads having the determined porosity of:
  - (1) a prefilter material selected from the group consisting of cellulose, diatomaceous earth, and spun glass,
  - (2) 0.8 to 2.0 micron pores,
  - (3) 0.22 to 0.6 micron pores, and
- (C) centrifuging the filtrate in a 50,000 to 89,000 *g* field.

2. The method according to claim 1 wherein filters (2) and (3) have porosities of 1.2 and 0.45 microns respectively.

3. The method according to claim 1 wherein the myxovirus is an influenza virus.

References Cited

UNITED STATES PATENTS

| | | | |
|---|---|---|---|
| 2,355,676 | 8/1944 | Rake et al. | 424—89 X |
| 2,854,143 | 9/1958 | Novak | 210—335 |

JAMES L. DE CESARE, Primary Examiner

U.S. Cl. X.R.

210—73, 78, 335; 424—89